United States Patent
Gumpinger

(10) Patent No.: US 9,944,013 B2
(45) Date of Patent: Apr. 17, 2018

(54) GRIPPER WITH TOGGLE LEVER ARRANGEMENT

(71) Applicant: BRÜCKNER MASCHINENBAU GMBH & CO. KG, Siegsdorf (DE)

(72) Inventor: Helmut Gumpinger, Anger (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 0 days.

(21) Appl. No.: 15/500,401

(22) PCT Filed: Jul. 16, 2015

(86) PCT No.: PCT/EP2015/001466
§ 371 (c)(1),
(2) Date: Jan. 30, 2017

(87) PCT Pub. No.: WO2016/015836
PCT Pub. Date: Feb. 4, 2016

(65) Prior Publication Data
US 2017/0217081 A1  Aug. 3, 2017

(30) Foreign Application Priority Data
Jul. 31, 2014 (DE) .......................... 10 2014 011 513

(51) Int. Cl.
*B29C 55/20* (2006.01)
*B29K 105/00* (2006.01)

(52) U.S. Cl.
CPC ........ *B29C 55/20* (2013.01); *B29K 2105/256* (2013.01)

(58) Field of Classification Search
CPC .............................. B29C 55/165; B29C 55/20
See application file for complete search history.

(56) References Cited

U.S. PATENT DOCUMENTS

| 1,119,824 A | 12/1914 | Hayward |
| 3,104,444 A | 9/1963 | Nash |

(Continued)

FOREIGN PATENT DOCUMENTS

| DE | 17 10 745 | 11/1955 |
| DE | 37 41 582 | 6/1989 |

(Continued)

OTHER PUBLICATIONS

International Preliminary Report on Patentability issued in PCT/EP2015/001466 dated Feb. 9, 2017.

(Continued)

*Primary Examiner* — Yogendra N Gupta
*Assistant Examiner* — Joseph S Leyson
(74) *Attorney, Agent, or Firm* — Nixon & Vanderhye P.C.

(57) ABSTRACT

An improved gripper with a toggle lever arrangement is characterized by, among others, the following features — the gripper comprises a gripper lever which is pivotable with respect to a gripper holder around a gripper axis, — the gripper lever is configured as a toggle lever and comprises in addition a first and a second toggle lever leg which are pivotable relative to each other around a toggle lever axis, — in addition a force application unit is provided which acts on the second toggle lever leg pivotable around the toggle lever axis and/or on the toggle lever flap, — the force application unit is thereby configured such that during pivoting of the gripper lever from the release position into the closed- and clamping position thereof, the toggle lever flap initially touches down on the side of the gripper table lying away from the material web while prefixing the material web in this region, before the toggle lever flap reaches the final closed- and clamping position thereof during the remaining pivoting process, in which position it is force-actuated in the direction of the gripper table and (Continued)

holds the material web edge clamped between the gripper surfaces.

4 Claims, 10 Drawing Sheets

(56) References Cited

U.S. PATENT DOCUMENTS

| | | | |
|---|---|---|---|
| 3,175,245 A | | 3/1965 | Kreeft et al. |
| 3,180,002 A | * | 4/1965 | Nash ............... B29C 55/20 26/93 |
| 5,267,378 A | * | 12/1993 | Wellenhofer ...... B29C 55/20 26/89 |
| 5,737,812 A | | 4/1998 | Breil et al. |
| 5,797,172 A | | 8/1998 | Hosmer |
| 5,970,589 A | | 10/1999 | Hayashi et al. |
| 2009/0176037 A1 | | 7/2009 | Otoshi et al. |

FOREIGN PATENT DOCUMENTS

| | | |
|---|---|---|
| DE | 195 19 095 | 10/1995 |
| DE | 44 36 676 | 4/1996 |
| DE | 44 41 020 | 5/1996 |
| DE | 195 10 141 | 8/1996 |
| DE | 100 17 347 | 10/2001 |
| DE | 10 2013 011 965 | 1/2015 |
| EP | 0 471 052 | 2/1992 |
| EP | 0 782 499 | 7/1997 |
| EP | 2 188 111 | 5/2010 |
| JP | 2003-236927 | 8/2003 |
| JP | 2005-262680 | 5/2005 |
| JP | 2006-198817 | 8/2006 |
| WO | WO 89/12543 | 12/1989 |
| WO | WO 2004/071748 | 8/2004 |
| WO | WO 2008/040480 | 4/2008 |
| WO | WO 2009/030195 | 3/2009 |
| WO | WO 2009/084722 | 7/2009 |
| WO | WO 2014/094803 | 6/2014 |

OTHER PUBLICATIONS

International Search Report for PCT/EP2015/001466, dated Oct. 22, 2015, 4 pages.

* cited by examiner

GRIPPER WITH TOGGLE LEVER ARRANGEMENT

This application is the U.S. national phase of International Application No. PCT/EP2015/001466 filed 16 Jul. 2015 which designated the U.S. and claims priority to DE Patent Application No. 10 2014 011 513.5 filed 31 Jul. 2014, the entire contents of each of which are hereby incorporated by reference.

The invention relates to a gripper comprising a toggle lever arrangement for a transport system, in particular a stretching system in the form of a sequential stretching system or a simultaneous stretching system.

Stretching systems are used in particular in plastics film manufacture. Simultaneous stretching systems are known, in which a plastics film can be stretched in the transverse and longitudinal directions simultaneously. Sequential stretching systems are also known, in which a plastics film is stretched in two successive stages, for example initially in the longitudinal direction and subsequently in the transverse direction (or vice versa).

The material web to be stretched, thus generally a plastics film, is captured by a clamping device, known as grippers, which are arranged displaceably on peripheral guide rails on the two sides of the material web to be stretched. The grippers are displaced in succession from an entry zone (in which the edge for example of a plastics film to be stretched is captured) via a stretching zone (in which the opposing grippers on the guide rail portions are moved away from one another by means of a transverse component so as to diverge from the transport direction) to an exit zone, and subsequently on a return path back to the entry zone, it being possible to subject the film for example to some relaxation and/or thermal post-treatment in the exit zone.

The aforementioned sequential and simultaneous transport systems usually comprise two peripheral guide paths arranged symmetrically with respect to a vertical plane of symmetry, each guide path comprising a guide rail covering said path in part or in full, along which the transport elements are displaced or moved on the guide path. These transport units usually comprise gripper units and drive units, sometimes also referred to as transport parts. The guidance and force absorption of the transport parts on the guide rail may be provided by way of slide elements, roller elements, or a combination of slide and roller elements.

In the art, grippers are required for longitudinally moving material webs, in particular film webs. For example, in a device for stretching plastics film webs, closed guide devices are provided symmetrically with respect to the transport direction, to the left and to the right respectively, on which devices peripherally interconnected gripper chain members or gripper carriages are provided, on which the grippers engage the material or film web at the start of the device and move it onwards as far as the end of the device. Likewise, corresponding machines are known in which the gripper carriages are not mechanically interconnected, but are instead movable along the endless rail guide independently by way of linear motor drives. Transport systems of this type are conventional in particular for stretching systems in which plastics films are stretched along two axes simultaneously. Corresponding gripper carriages are disclosed for example in DE-A-44 36 676 and in DE-A-195 10 141.

The various stretching system types are to be described briefly in the following. In all previously known stretching systems, differently configured clamping devices are used for the material or product web in general and for a plastics film web to be stretched in particular.

A) Simultaneous Stretching Systems Comprising Linear Motors:

In simultaneous stretching systems, the transport units are moved by means of linear motors. A linear-motor-driven transport system of this type is known for example from WO 89/12543 A1 or DE 44 41 020 C1.

These linear-motor-driven transport systems, and in particular stretching and simultaneous stretching systems, are generally constructed in such a way that the gripper part is connected to the actual drive or transport unit via a bridge. The drive forces are introduced via secondary parts which are for example flange-mounted, for example in the form of permanent magnets (using an associated magnetic cage), which are attached to the drive or transport units so as to be displaceable together therewith. Idling transport units, known as "idlers", may be provided between the transport units driven by linear motor drive, and are not equipped with a secondary part of this type using permanent magnets. Otherwise, however, these non-driven transport units are designed to correspond in construction to the driven transport units, and are likewise moved along by way of film forces introduced via the material web to be stretched, generally via the plastics film to be stretched, since the corresponding grippers capture the film edge as it passes through in the drawing direction of the film web. The transport units driven by the linear motor thus move the plastics film to be stretched through the film system by way of the gripper units, the non-driven transport units placed in between thus being moved along by way of the plastics film moved through the system.

B) Mechanical Simultaneous Systems:

A mechanical stretching system is known for example from DE 37 41 582 A1, WO 2004/71748 or U.S. Pat. No. 5,970,589. In this embodiment too, the gripper transport units are supported by way of rollers rotating on horizontal and vertical axes on the upper and lower face and on the two vertical faces, positioned so as to be mutually offset in the horizontal direction, of a guide and weight absorption rail. In addition, there is also a further control rail, by way of which the spacing between the grippers in the region of the diverging simultaneous stretching zones can be set differently in the machine direction (MD) by way of chain shear members.

C) Mechanical Chain Stretching System:

A previously known transverse stretching system or transverse stretching stage within a stretching system is known for example from U.S. Pat. No. 5,797,172 A, EP 471 052 and WO 2014/94803. In these prior publications, a material web to be stretched, thus generally a plastics film, is captured by means of grippers, which are fixed to chains and which are arranged displaceably on peripheral guide paths on the two sides of the material web to be stretched. The grippers are displaced in succession from an entry zone (in which the edge for example of a plastics film to be stretched is captured) via a stretching zone (in which the opposing grippers on the guide rail portions are moved away from one another by means of a transverse component so as to diverge from the transport direction) to an exit zone, and subsequently on a return path back to the entry zone, it being possible to subject the film for example to some relaxation and/or thermal post-treatment in the exit zone.

D) The Clamping Device Used in the Various Stretching Systems:

In principle, it is common to all cited embodiments that the product or material web or in particular the film web is clamped in a clamping device (gripper device) and guided through the various displacement zones of a transport system in general or stretching system in particular by a transport part connected thereto, for example a chain, a pantograph or a linear motor.

In the clamping device, the corresponding gripper levers, also known as blade flaps, are pivoted by suitable actuation members, initially into the locked position thereof, in which they hold the material or film web clamped between the blade piece and the gripper base, and at the end of the device back into the open position thereof, in which they release the material or film web again. In the art, the grippers are provided with an axle bolt, which is mounted in a corresponding axle mounting formed on the gripper body. A gripper of this type is known for example from laid-open publication DE 17 10 745, from U.S. Pat. No. 3,104,444, from DE 100 17 347 or from DE 195 19 095, which corresponds to EP 0 782 499 B1.

For particular film types having a high tendency to tear and/or for high introduced stretching forces, it is necessary to construct the clamping device specifically in a toggle lever configuration.

In particular in film stretching systems which work simultaneously, in other words stretch the cast film along two substantially orthogonal axes simultaneously, depending on the process conditions the edges may be exposed to strong forces. This is because the gripper spacings increase with the longitudinal stretching ratio in this method, and thus the tensile forces of the film are introduced substantially via the edge.

In this context, if for example the gripper lever is placed at an incorrect angle, this may result in the film being stretched out from below the gripper lever or in the film being damaged in such a way that it tears.

The known constructions are only suitable for relatively limited ranges of film edge thicknesses. This is also partly due to the requirement for the gripper lever arrangements to take up as little installation space as possible, since the gripper carriages in film stretching systems are moved through treatment ovens. Depending on the edge thickness, the clamping point between the gripper lever and gripper base is shifted. For extremely thin material webs or films, the holding point would migrate towards the centre of the film web, whilst for very thick film web edges, the clamping point would be displaced away from the web centre. This would have drawbacks for various reasons.

As a result of the high outputs of modern film stretching systems, more and more importance is being placed on the flexibility of these machines, in such a way that the machines are constantly at full capacity. Economical operation of systems of this type is only made possible by a varied range of products and a minimum expense for the film mountings. Therefore, it should be possible to change to a different film product with virtually no conversion time. However, this also means that different film thicknesses are to be manufactured on a single film stretching system without having to make changes to the grippers.

Further, in some films, the edges may tend to roll inwards in part in parallel with the running direction of the film. In this case, the conventional grippers fail because the gripping region thereof cannot cover the doubled edge thickness. This means that for example in film stretching systems the film is not held by the grippers and thus the entire production comes to a standstill.

DE 17 10 745 proposes optimising the contour of the clamp face. However, this known construction has the drawback that for thin films the clamp face protrudes beyond the gripper base towards the centre of the web. DE 100 17 347 proposes a mechanical linkage in particular for curved edges.

Toggle lever clamping devices are additionally also known in linear-motor-driven or other stretching systems, for example from DE 10 2013 011 965 or DE 195 10 141 C1.

In EP 2 188 B1 and WO 2009 30 195 A1 (which corresponds to EP 2 188 111 B1), magnets are used to assist in opening the gripper lever.

A previously known clamping device comprising a toggle lever construction is also known from U.S. Pat. No. 5,970,589 A.

This prior publication discloses by way of example a clamping device comprising a gripper part which is connected to a transport part, in this case to a pantograph, and moved by the stretching system.

The gripper known from this prior publication consists of a mounting, in which a gripper lever known as a blade flap is fixed by way of an axle bolt. The blade flap is closed and opened at the entry and exit by way of an opening/closing part and an opening/closing unit (not shown), and clamps the material or product web, in particular a plastics film, between the gripping face on the gripper and a gripper base, or releases the material web or plastics film. In this prior publication, the gripper lever is configured as a toggle lever, and comprises a flap comprising a sliding face. By way of constructional recesses, the toggle lever is connected via a toggle lever axle to the blade flap. In this embodiment, particular significance is placed on a provided positioning spring, which provides that the gripping face of the gripper lever always meets the product web or plastics film in the same relative position when the gripper is closed.

The prior art therefore includes grippers comprising a toggle lever or a stamp foot, the gripper lever being held in position or brought into position by its inherent weight (WO 2008/40 480, JP 2003 23 69 27), by an attached spring (U.S. Pat. No. 5,970,589, JP 2006 19 88 17, JP 2005 26 26 80) or by a transmission (DE 100 17 347).

Thus, all of the aforementioned solutions have drawbacks.

Since in gripper constructions in which the stamp is only held in a stationary manner by the inherent weight thereof (for example by eccentric mounting), this results in the problem that in the event of a gripper which is moved particularly rapidly, along with a blade flap which is moved rapidly in this case, (dynamically) significant acceleration forces occur, which act on the stamp and do not hold it stably in the intended position thereof.

In the case of a spring construction, as the film is gripped, the counter force becomes larger and larger, leading to a reduction in the gripping force. The larger the movement, the greater the counter force to reduce the gripping or holding force.

In the case of a transmission, the stamp foot is held in a constrained position and thus pressed onto the film. Since the film is still being stretched even under the stamp foot, the stamp is no longer positioned optimally on the film, and this leads to holding problems.

For stretching thermoplastic synthetic resin films, in particular for simultaneous (simultaneous biaxial) stretching of films of this type, various shapes of the gripping faces $25d$, $25e$ are formed, and are intended to prevent the film from slipping out of the gripping tools during stretching. For the same purpose, gripping tools are used of which the gripping or contact faces comprise indentations or are roughened.

The roughened configuration of the contact faces may result in surface defects, which can engage in the film material and naturally damage it at a corresponding tensile load.

Gripping tools of this type are therefore very suitable for stretching flexible synthetic resin films made of polyester, polypropylene, polyvinyl chloride, polyvinylidene chloride, polystyrene and the like.

For simultaneous biaxial stretching of films made of special materials or for example of polyamide or the copolymerisates thereof, special solutions for the clamping devices are required, such as are carried out herein according to the invention.

The main reason for this is that for example polyamides have a stronger hydrogen bond than other thermoplastic resins, and so a much higher tensile force is required for stretching polyamide films than for the other films.

The "grip" of the gripping tools thus has to be much "stronger" than for the other films, and so the polyamide films may tear and thus the stretching process may not run optimally.

To achieve this high mechanical strength, currently conventional gripping tools consist of suitable metals, the inherently low coefficient of friction of said metals at the contact or gripping faces is increased in that these faces are roughened to a lesser or greater extent in the aforementioned manner, but this results in the previously highlighted drawbacks. The use of metal gripping tools further leads to the major drawback that they only bring about a "partial grip". This term "partial grip" is intended to refer to the phenomenon whereby, when a thermoplastic synthetic resin film is stretched simultaneously and biaxially, during the stretching process the thickness of the film within the area gripped by the gripper gradually decreases, in such a way that the gripping or contact faces of the grippers no longer compress the film between them and as the stretching continues the gap between two contact faces from the inside to the outside becomes larger, in such a way that eventually the film may tear or simply slip out of the gripping tools. Tearing of the film is further promoted by the tooth-like configuration of the contact faces in this case.

In view of the numerous drawbacks of the hitherto conventional gripping tools for stretching thermoplastic synthetic resin films, in particular for simultaneous biaxial stretching of polyamide films, the object of the invention is therefore to provide a gripping tool of this type which does not have any of these drawbacks and which fully and completely meets all of the requirements occurring in the various stretching processes for the various synthetic resin films.

OBJECT OF THE INVENTION

The object of the invention is to provide an improved gripper comprising a gripper lever arrangement, which makes it possible for even sensitive material and product webs, in particular sensitive plastics films, not to be damaged or only to be damaged minimally during the clamping process.

The invention is achieved by way of the features set out in claim 1. Advantageous embodiments of the invention are set out in the dependent claims.

As a result of the invention, a major improvement over conventional solutions is achieved by comparatively simple means.

The invention is based on the finding that the holding force between the clamping device and a material or product web in general and a plastics film in particular can be improved by one or more of the following options:

an improvement can be achieved in that the placement position of the gripper lever is always placed at the same relative position on the material web or plastics film;

damage to the material web or plastics film towards the centre of the material web is to be prevented in the context of the invention, since the material web or plastics film is also stretched from the clamping and gripping region, and the damage occurring here (scratches, indentations, impressions, bumps etc.) can lead to tears in the material web or in the film;

further, in the context of the invention, it can be provided that the wear from the high stretching stress in the material web or in the plastics film is prevented so as to achieve constant holding conditions;

further, in the context of the invention, the placement of the clamping and gripping face on the underside of the gripper lever in the region of the rear face, in other words the outwardly directed edge face of the material web or plastics film, leads to lower frictional forces when the blade flap is closed; this reduces the risk of the material web, in particular in the form of the plastics film, sliding out during gripping;

further, in the context of the invention, constant conditions for holding the material web and plastics film may be provided, specifically even a) if there is a complete non-positive fit after the gripper has closed, and b) if the contact faces of the gripping members are formed as surface configurations, in such a way that, as the thickness of the material web or plastics film continues to decrease during the stretching process, the resulting increasing spacing of the contact faces from the material web can be compensated; this provides that the contact faces thus "follow" the thinning material web or the thinning plastics film to some extent and thus always hold the relevant portions of the material web so as to be rigidly clamped.

In the following, the invention is described in greater detail by way of drawings, in which, in detail:

FIG. 2b is a corresponding cross-sectional view through a gripper part rigidly connected to and displaceable by way of a transport part according to FIG. 2a;

The transport and/or stretching system discussed in the following is described by way of a simultaneous stretching system. The construction of the claimed clamping device (gripper) applies in principle to simultaneous, linear-motor-driven or pantograph systems, but also to sequential stretching systems comprising chain drives or generally to transport systems comprising corresponding grippers and gripper devices. These may be sliding or roller systems.

Figure 1A:
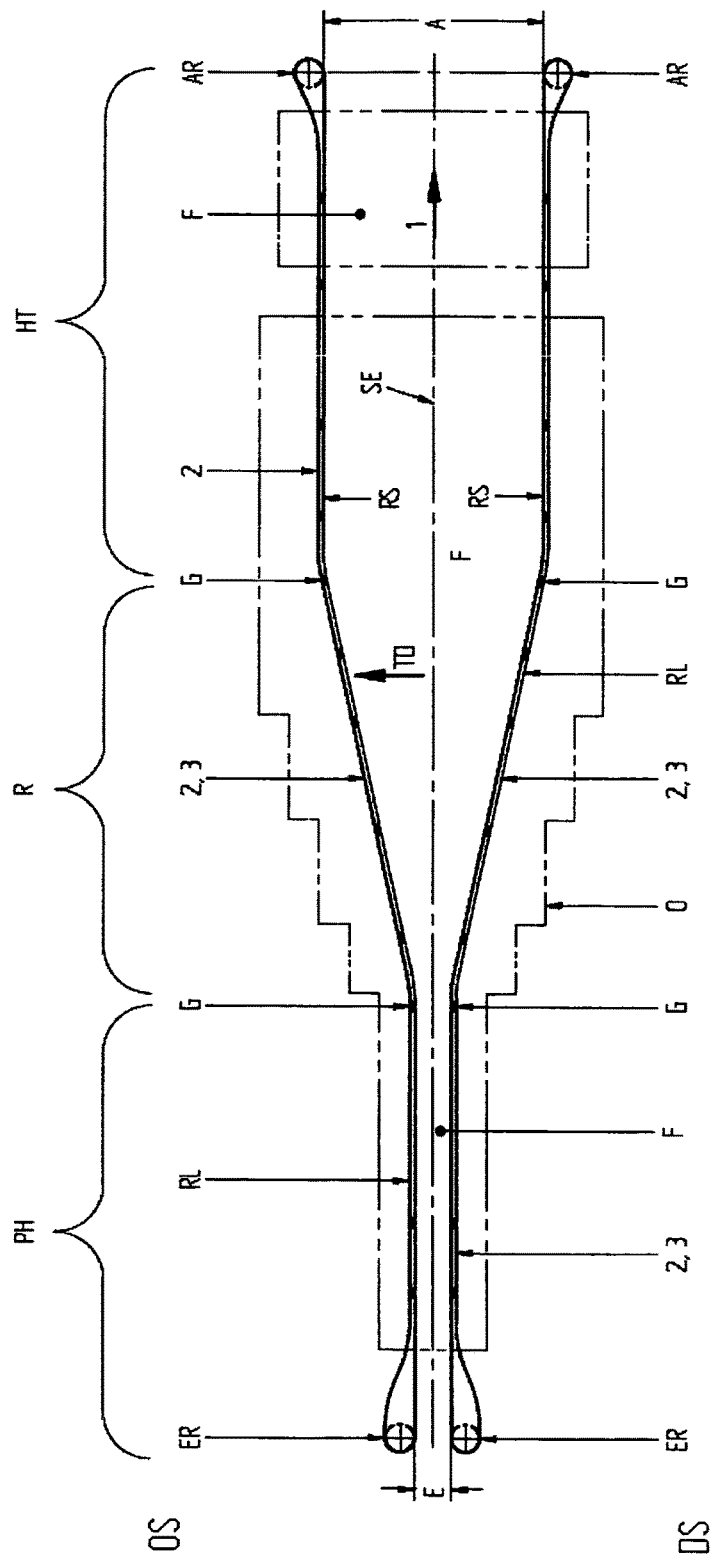
FIG. 1a is a schematic plan view of a simultaneous stretching system, in which the return side is arranged so as to extend within an oven together with the advance side.

A stretching system of this type, shown in FIG. 1a, comprises two symmetrically formed drive systems, which are positioned symmetrically with respect to a central plane of symmetry SE extending perpendicular to the plane of the drawing. FIG. 1a shows the two drive systems arranged symmetrically with respect to the plane of symmetry SE in the drawing direction 1, the material web to be treated, in other words stretched, in particular in the form of a plastics film F, being moved through, in the drawing direction 1, between the two drive systems circulating on closed paths 2.

An unstretched film F (the term "film" being used in the following even through a treatment web F in general may be correspondingly treated and simultaneously longitudinally and transversely stretched by a stretching system of this type, in such a way that the invention is not limited to a plastics web) enters the stretching system in an entry region ER, where it is gripped and clamped at both edges 8 on the stretching or process side RS by grippers 6 which are discussed further in the following, such as are shown by way of example in FIG. 2b, specifically on the operator side (OS) and on the drive side (DS). The film F is subsequently heated in a downstream preheating zone PH and subsequently supplied to a stretching zone R, so as to be stretched simultaneously in the longitudinal and transverse directions therein. Subsequently, the stretched film F passes through various thermal treatment zones HT, in which the film may also be relaxed. At the output AR of the stretching system, in other words at the end of the exit zone A, the film is gripped by suitable means and subsequently leaves the simultaneous stretching system.

Figure 1B:
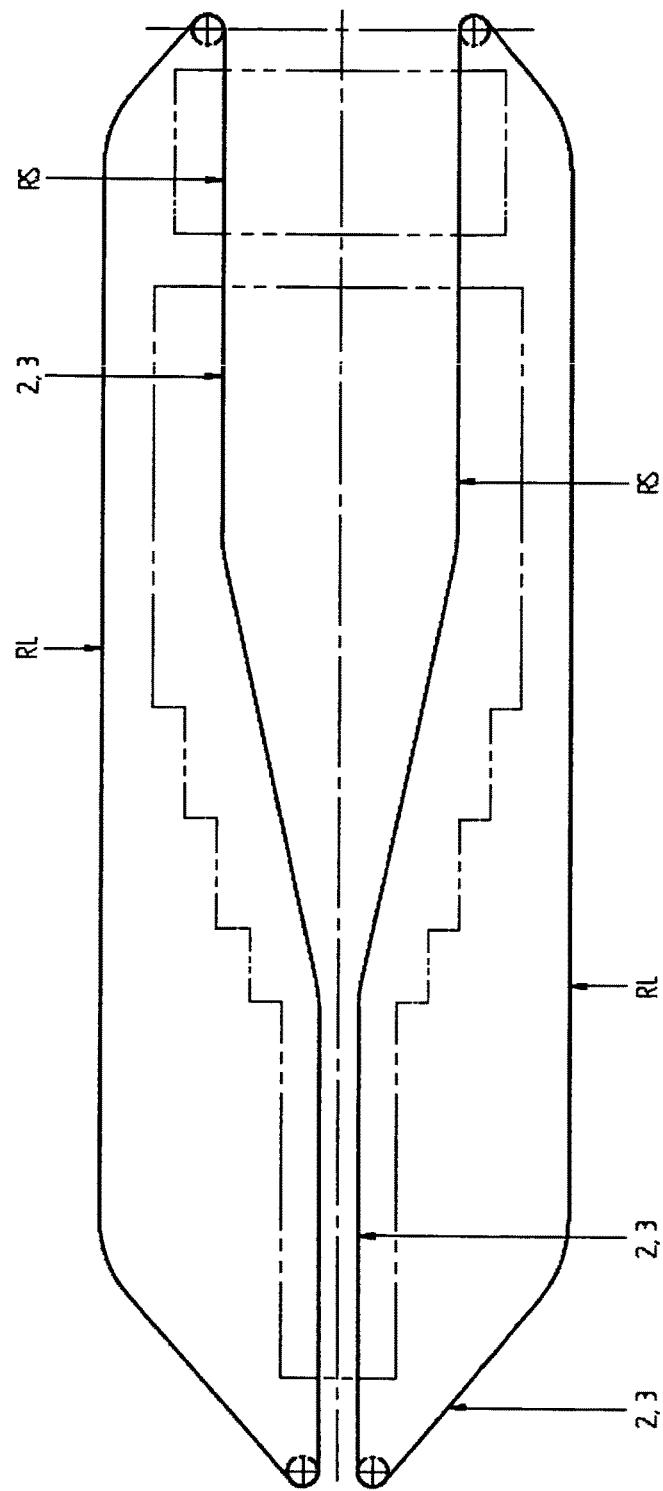
FIG. 1b shows an embodiment modified from FIG. 1a, in which the return side is separated from the process side and extends outside an oven.

Otherwise—as is also shown in FIG. 1b—the guide rail may extend differently in the advance region, and thus in the stretching region, and in the return region, specifically in such a way that for example only the guide rail passes through an oven O and is guided back outside the oven on the return side RL. In this regard, reference is made to known stretching systems and associated structures.

The further construction is to be explained in the following using the example of a linear-motor-driven gripper device, specifically initially with reference to FIGS. 2a and 2b.

Figure 2A:
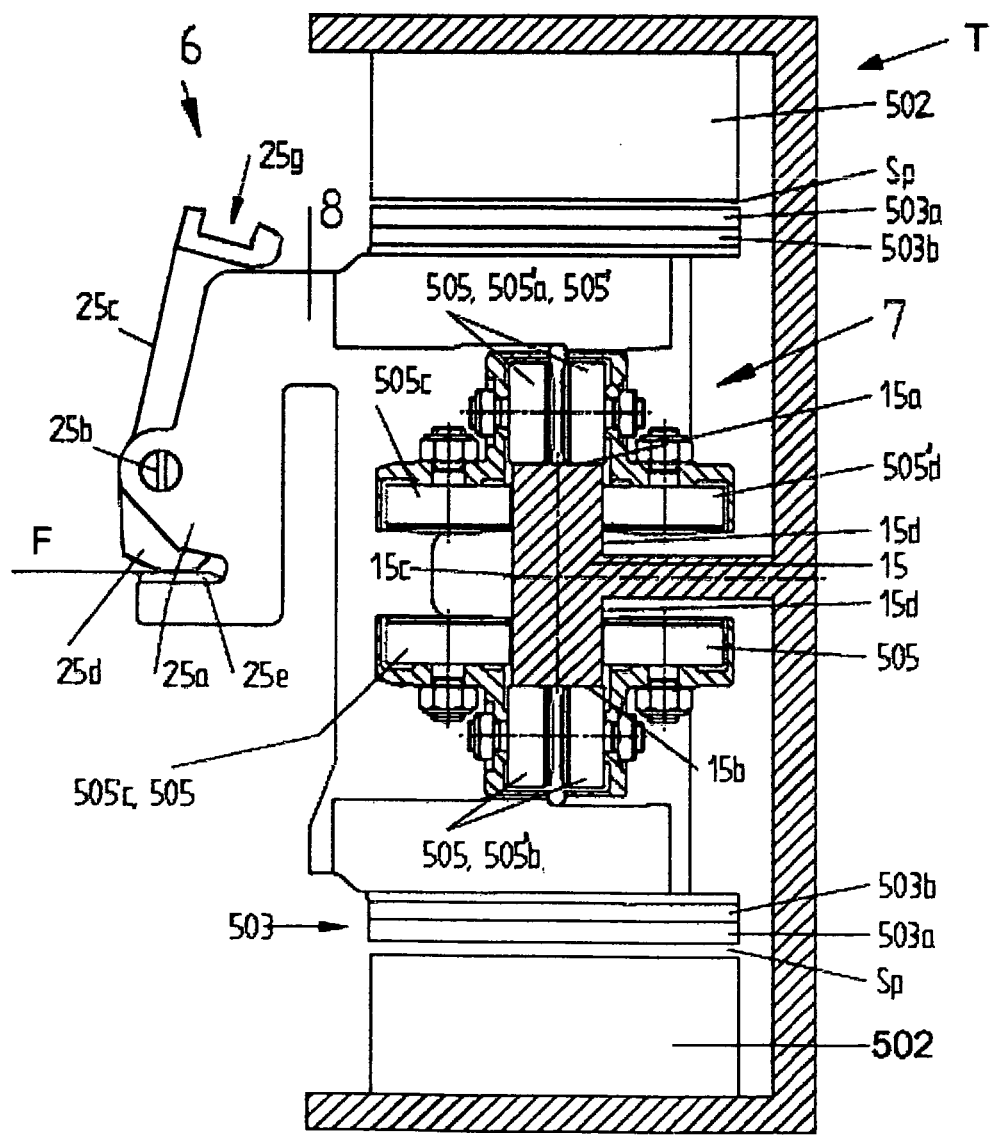
FIG. 2a is a schematic cross-sectional view through a transport part of a gripper transport unit, which is displaceable along a guide rail by means of a linear motor drive.
Figure 2B:
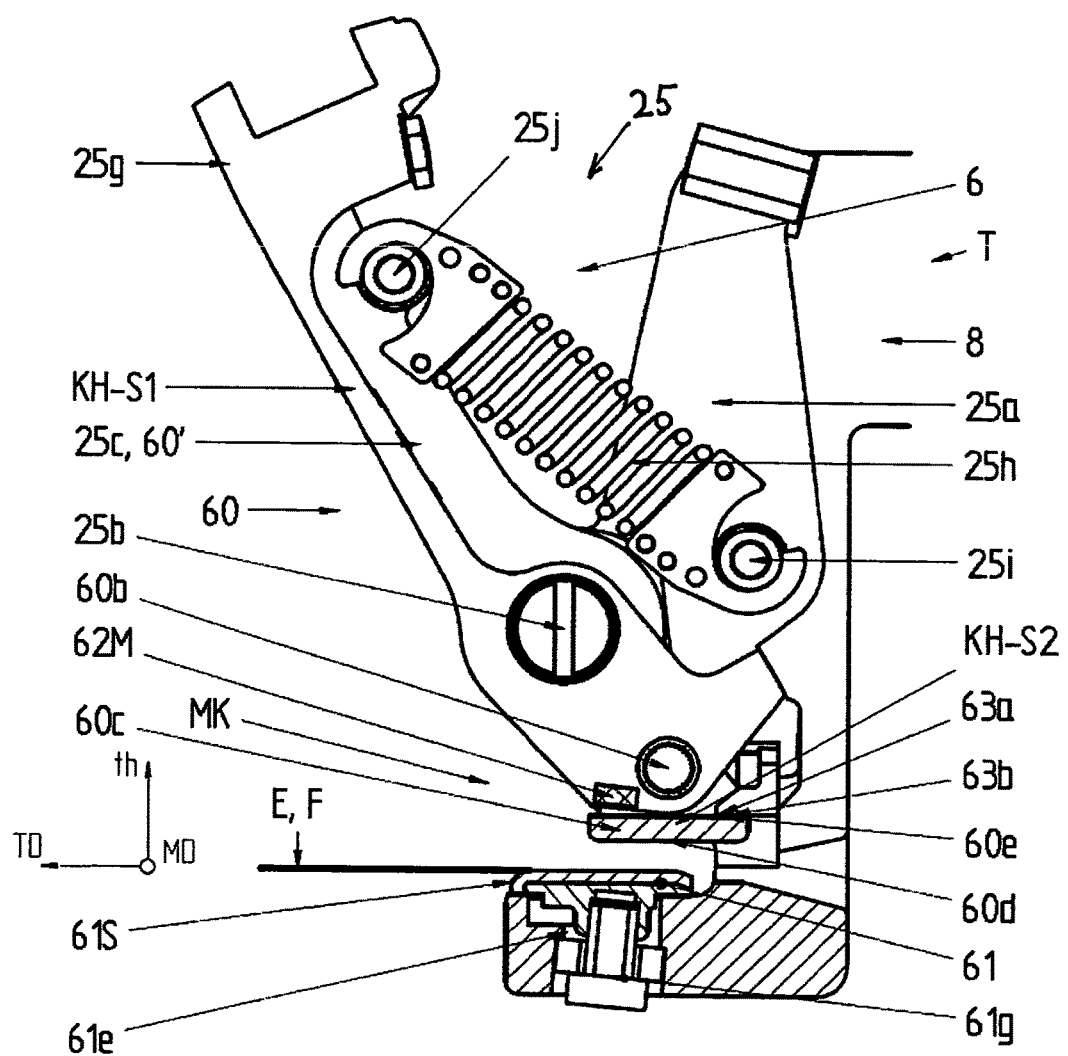

FIG. 2a is a cross-sectional view transverse to the guide rail of a transport part 7, which is rigidly connected via a bridge 8 to the gripper part 6 shown in FIG. 2b to form a unit. The gripper transport unit T is thus subdivided into the gripper part 6 and the transport part 7, the gripper part 6 being carried by way of the transport part 7 and displaced together therewith.

In the embodiment shown, the gripper part 6 and the transport part 7 are interconnected via a gripper bridge 8, which can be associated with the transport part or with the gripper part depending on point of view. Below this bridge part 8, there is a U-shaped opening which is open at the bottom, and by which the gripper part 6 is slightly separated from the actual transport part 7. However, any other desired constructions are also possible.

The actual construction of the linear-motor-driven simultaneous stretching system comprising the corresponding linear motor drive is known for example from EP 0 455 632 B1 or DE 44 36 676 C2, to the entire disclosure of which reference is hereby made. The cross-sectional view of FIG. 2a shows the guide and support rail 15, which consists of a horizontal running face 15a, 15b and two vertically orientated running faces 15c, 15d.

In the present embodiment, at least one pair of running rollers 505 runs on each running face.

Instead of the aforementioned running rollers or running wheels 505, however, corresponding slide elements 505' may also be provided, for example slide elements 505'a, 505'b, 505'c and 505'd. Likewise, mixed embodiments using running wheels in part and using slide elements in part are also possible.

The corresponding transport part is driven by way of linear motors, which comprise stationary primary parts 502 and secondary parts 503 which can move together with the gripper transport parts T. In other words, the grippers, i.e. the gripper 6, along with the transport parts 7 are longitudinally displaced and moved along the guide rail 15, which in this case also simultaneously serves as a transport rail 15 (monorail), by means of the primary parts 502 and the secondary parts 503.

The aforementioned primary parts 502 are attached in parallel with the guide and support rail 15. The secondary parts 503 consist of the aforementioned permanent magnets 503a, which are each fixed in a holding cage 503b, which is in turn held on the gripper body 6.

The gripper part 6, which is rigidly connected to the aforementioned transport part, the technical details of which may be derived from EP 0 455 632, is shown in the cross-sectional drawing of FIG. 2b. In FIG. 2b, the drawing direction of the material web or plastics film is denoted MD, in other words the machine longitudinal direction extending perpendicular to the plane of the drawing. The transverse direction TD of the transport or stretching system is also shown, in other words in the direction extending transverse to the material web. Finally, th marks a vector direction perpendicular to the material web plane, in which the thickness of the film or material web clamped in the gripper is orientated.

The following description is basically identical to all grippers (clamping devices) found on the market.

The gripper part 6 comprises a gripper mechanism 25 comprising a gripper mounting 25a, which in the embodiment shown is rigidly connected to the transport part 7 via the aforementioned bridge 8 and which ultimately supports the entire gripper mechanism.

The gripper mechanism 25 comprises a gripper axle 25b, on which the actual gripper lever 25c is held so as to be pivotable about a gripper axle 25b. The gripper axle 25b is usually orientated so as to extend in parallel with the material web plane E, and thus usually more or less in parallel with the guide rail which supports the entire transport part along with the gripper part.

In addition, in the gripper mechanism, an opening or closing part 25g is provided on the free end of the gripper lever 25c. A mechanical and/or magnetic apparatus for opening and closing the gripper lever may act here, as is disclosed in principle in EP 0 782 499 B1, to which reference is hereby made.

Finally, the gripper lever 25c is tensioned by means of a spring apparatus 25h, for which purpose the spring apparatus 25h is anchored and/or suspended both on an anchoring point 25i on the gripper mounting 25a and opposite on the gripper lever on a fastening point 25j provided there. This anchoring point 25j is positioned between the pivot axle 25b and the free gripper lever end.

In the embodiment shown, the gripper lever 25c is formed as a toggle lever mechanism 60 comprising a toggle lever 60', which thus comprises, in addition to the pivot axle 25b, a further parallel toggle lever axle 60b positioned so as to be offset therefrom.

As a result, two toggle lever arms are formed, specifically a first toggle lever arm KH-S1, in the longitudinal extension region of which the pivot axle 25b is located, and a second toggle lever arm KH-S2, which is pivotable about the toggle lever axis 60b relative to the first toggle lever arm KH-S1.

At the free end of the second toggle lever arm KH-S2 there is a toggle lever flap 60c, on the underside of which a gripping face 60d for fixing a material web or a film F is formed.

The gripper base 61 is located below the gripping face 60d of the toggle lever flap 60c, and also comprises a gripping face 61d comprising a gripper base surface 61S. This defines the clamping plane E on which a material web or a plastics film F, in other words the edge thereof, can be held in a clamped manner.

The gripper base 61 itself can be anchored and mounted by means of a gripper base mounting 61e using a screw connection 61g to the gripper mounting 25a.

Finally, an orientation piece 63a comprising a directing face 63b mounted or formed on the gripper mounting 25a is also provided, and interacts with the toggle lever flap 60c, as will be discussed in the following.

Further, a force application apparatus MK is provided, and is preferably formed as a magnetic force linkage apparatus. For this purpose, on the lower free end of the second toggle lever arm KH-S2 in the embodiment shown, directly on the rear face of the toggle lever flap 60c, a permanent magnet 62M is mounted, and is anchored there by suitable measures. On the rear face of the toggle lever flap 60c, either a further magnet cooperating therewith in attraction or at least a ferromagnetic material is provided, or else the toggle lever flap 60c itself consists of a ferromagnetic material, at least in so far as the aforementioned permanent magnet 60M can exert attractive forces on the toggle lever flap 60c in the manner described in the following. However, the relevant relationships may also be reversed, to the effect that a permanent magnet is provided on the rear face of the toggle lever flap 60c, and together with a corresponding ferromagnetic part can generate attractive magnetic forces on the second toggle lever arm KH-S2. Generally, in this regard reference is therefore merely made to a magnetic force linkage element MK which generates attractive forces.

In the following, the mode of operation of this embodiment according to the invention is described in greater detail, specifically in the case where a corresponding gripper device along with a transport part 7 and the associated gripper part 6 is supplied for example to the entry of a stretching system, the gripper lever 25c being opened at this entry for example by an electromagnetic opener, such as is disclosed in EP 0 782 499 B1, by means of a magnetic non-positive fit via the opening and/or closing part 25g positioned above.

The principle described in greater detail in the following is thus suitable both for grippers of simultaneous systems and for sequential systems, regardless of the drive technology used in relation to the transport parts, in other words the gripper transport units T.

Figure 3:
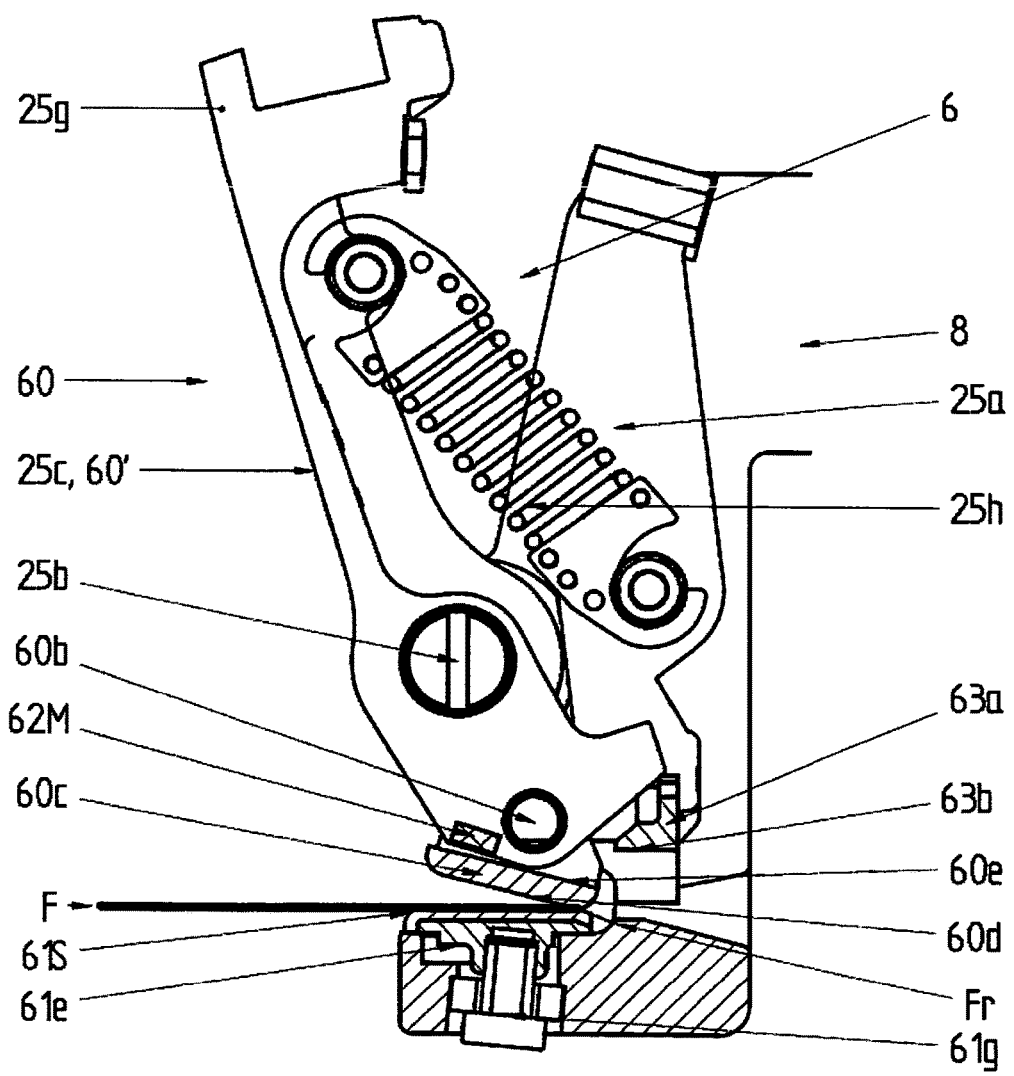
FIG. 3 is a view corresponding to FIG. 2b during the closing process of the gripper lever, showing an intermediate position in which a toggle lever flap is placed on a gripper base merely in a region positioned remote from the material web.

The principle behind the invention is to be explained using the example of a linear-motor-driven gripper according to FIG. 3. The gripper lever 25c is opened at the entry by an electromagnetic opener, such as is disclosed in DE 195 19 095, by means of a magnetic non-positive fit via the opening or closing part 25g.

To make it possible to thread the film into the gripper 9 without disruption, the toggle lever flap 60c has to be moved into a defined position. For this purpose, the toggle lever is moved into the stop position thereof. In this context, the position of the toggle lever flap 60c provides that the stop face 60e thereof is orientated counter to the directing face 63b of the orientation piece 63a. The gripping face 60d of the toggle lever flap is parallel to the gripping face 61d of the gripper base coating 61S. The spacing of the two faces is configured depending on the thickness of the cast film to be stretched (or generally of a material web F to be clamped), and may for example be several mm. In addition, the toggle lever flap 60c is brought into the working region of the permanent magnet 62M and attracted thereby. The mounting in the axle 60b is configured so as to be very free-moving, so as to provide free movement of the toggle lever flap.

Figure 3A:
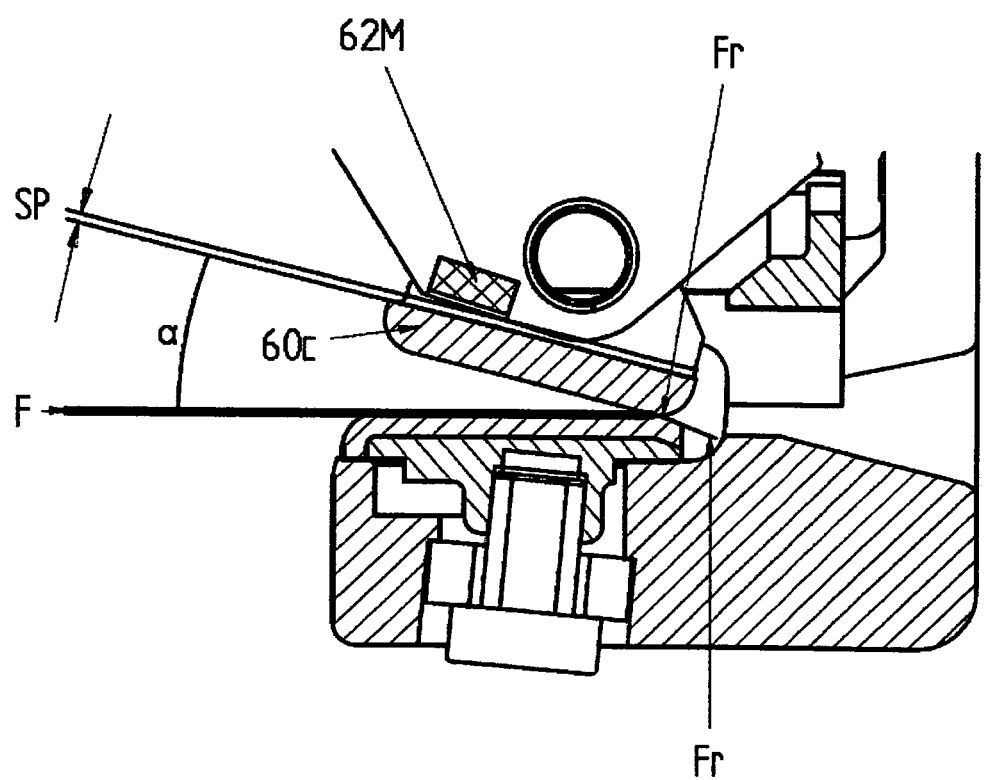
FIG. 3a is an enlarged detail of the intermediate position according to FIG. 3.

In FIGS. 3 and 3a, the film is threaded between the gripping faces and the gripper lever 25c is magnetically closed. According to the invention, the magnet 62M now provides that the rear face of the toggle lever flap 60c is initially placed on the edge region Fr of the film F. The placement position of the gripper lever is always placed in the same relative position on the film. The placement on the rear face leads to lower frictional forces when the blade flap is closed. This reduces the risk of the film sliding out during gripping. Since in addition the film is gripped or the gripper is closed very rapidly at high speeds, an undefined fixed position can result in resonances occurring in the toggle lever flap. The oscillation affects the thickness profile of the flexible film in an uneven manner. This leads to uncontrollable thickness fluctuations in the gripping region, and this can lead to the film tearing off or being ripped out (see FIG. 6c).

The stamp foot 6a, in other words the toggle lever flap 60c, is held in the optimum position thereof during placement on the film by the aforementioned magnet 62M (preferably in the form of a permanent magnet). After being placed on the film, the stamp 60c is rotated by the further movement of the blade flap 25c so as to be positioned on the film F. As the spacing from the magnet 62M increases, the force thereof becomes smaller, and there is barely any effect on the holding force from the magnet.

Figure 4:
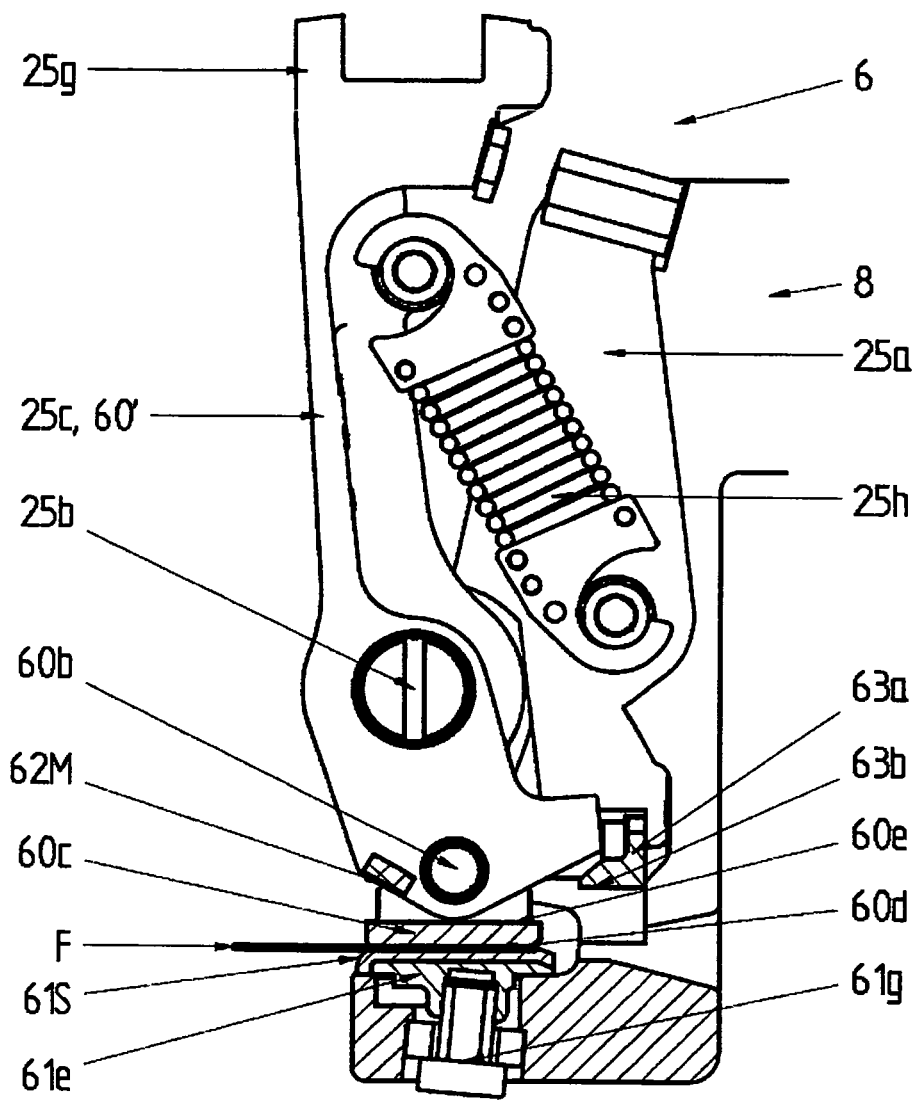
FIG. 4 is a view corresponding to FIGS. 2b and 3, but after the final closing and clamping position of the gripper is reached.

The pivot movement into the closed position is carried out until the first and the second toggle lever arm KH-S1, KH-S2 of the gripper lever 25c (blade flap 25c) in the form of the toggle lever 60' have reached the final closed position shown in FIG. 4, in which the gripping face 60d of the toggle lever flap 60c is positioned in a direct parallel position with respect to the gripping face 61d of the gripper base 61, is held so as to be biased thereon, and thus holds the material web or the plastics film F, in other words in particular the edge Fr of this material or product web or of the plastics film F, clamped in the plane E between the two gripping faces 60d and 61d.

For this purpose, it is necessary for a gap SP (see FIG. 3a, approximately 0.1 to 0.5 mm) to be maintained between the magnet 62M and the lever flap 60c. If the holding force is too large, the release impulse results in an undesired effect on the film thickness. An additional major advantage over the prior art which may be mentioned is that the magnet system is completely maintenance-free and wear-free.

FIG. 4 shows the situation when the gripper is completely closed. After placement on the rear face of the gripper on the film edge, the closing angle α (FIG. 3) is reduced continuously, without oscillation and without release impulse, by the magnet 62M until the closed position has been achieved. The film now runs through the preheating zone PH and is subsequently stretched.

Figure 5:
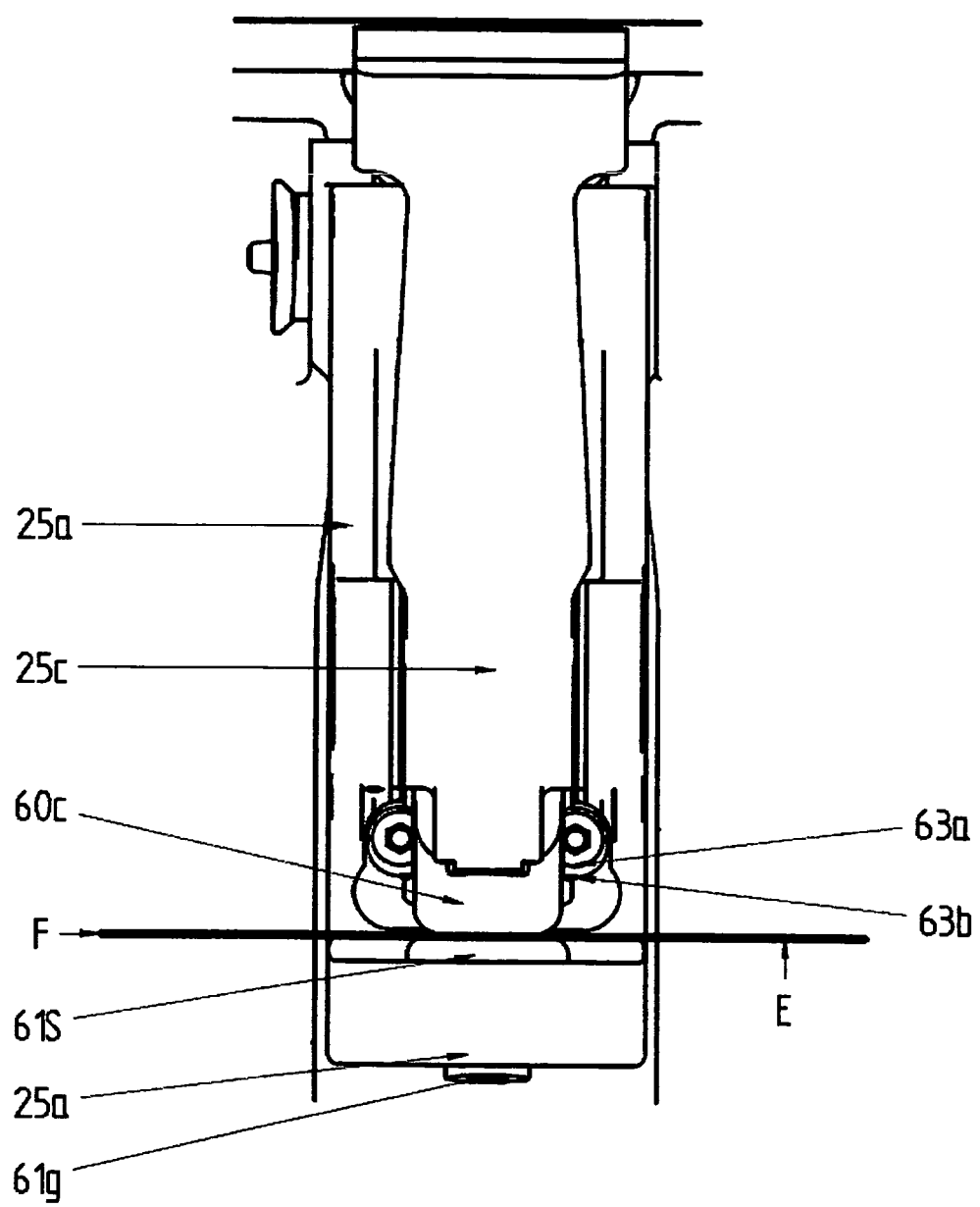
FIG. 5 is likewise a view of the gripper lever in a closing and clamping position, but in a view rotated by 90° from FIG. 4, parallel to the plane of a clamped material web.

FIG. 5 shows the arrangement during the placement of the stamp foot from the TD direction.

In other words, during the closing process of the gripper, in a first step the toggle lever flap 60c, which in the initial situation is positioned with a spacing from the gripper base 61 (and is thus preferably orientated in parallel with the plane of the gripper base), is moved onto the gripper base 61 in such a way that the toggle lever flap 60c is only placed on the gripper base 61 on the edge face positioned remote from the material web or from the film F. As the gripper lever 25c is closed, the gripper lever is adjusted further in such a way that the toggle lever flap 60c carries out a pivot movement with a decreasing angle α, until the entire area thereof is positioned on the film, and the gripper base is orientated in parallel therewith, the material web or plastics film F now being held in a clamped manner between the entire area of the two gripping faces 60d and 61d.

Instead of the aforementioned magnet 62M, a pole shoe may also be used, and like the magnet 62M is mounted on the gripper lever 25c at a correspondingly suitable point, in particular on the toggle lever arm KH-S2 or else on the toggle lever flap 60c, and subsequently cooperates with a corresponding ferromagnetic material or magnet shoe or pole shoe mounted on the associated other part, as was explained above.

Figure 6A:
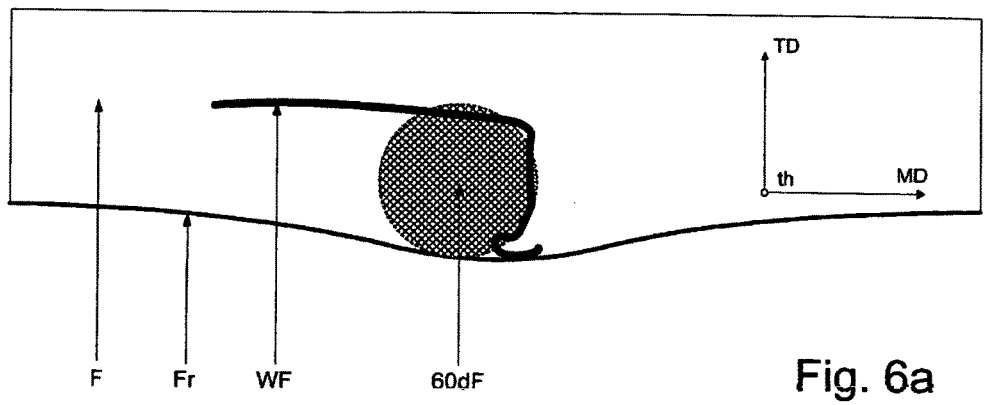
FIGS. 6a to 6c are three views illustrating the advantages according to the invention by contrast with a solution known in the art.

The effectiveness of the measure according to the invention has been demonstrated in comprehensive tests. FIG. 6a highly schematically shows a film piece F comprising the film edge Fr. The gripping face 60dF on the film is intended to correspond approximately to the gripping faces 60d and 61d of the toggle lever gripper or to the gripper base. In a prior art lever arrangement, the film is thinned considerably under the gripping faces, and the material under the area 60dF is ripped out by the stretching force. These extremely thin points were denoted KF, and were located below the gripping faces 60d, 61d when the stretching forces were introduced. In particular these thin points and the thinning of the material of the clamped material web and in particular of the plastics film below the gripping face 60dF mean that stretching forces can no longer be exerted. The film is completely ripped out of the gripper, or tears in this position.

Figure 6B:
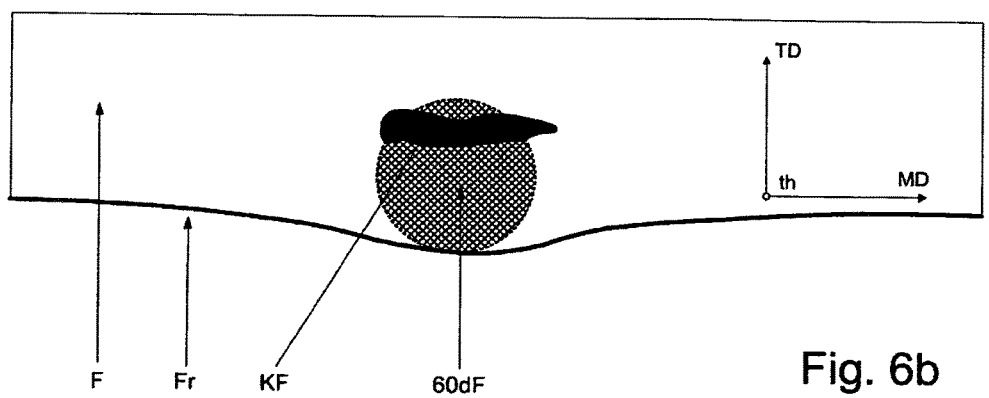

A similar situation applies in FIG. 6b, but the extremely thin point KF is still located within the gripping region. This improvement was achieved simply by an improved placement position but without the continuous reduction of the placement angle α under the magnet effect.

Figure 6C:
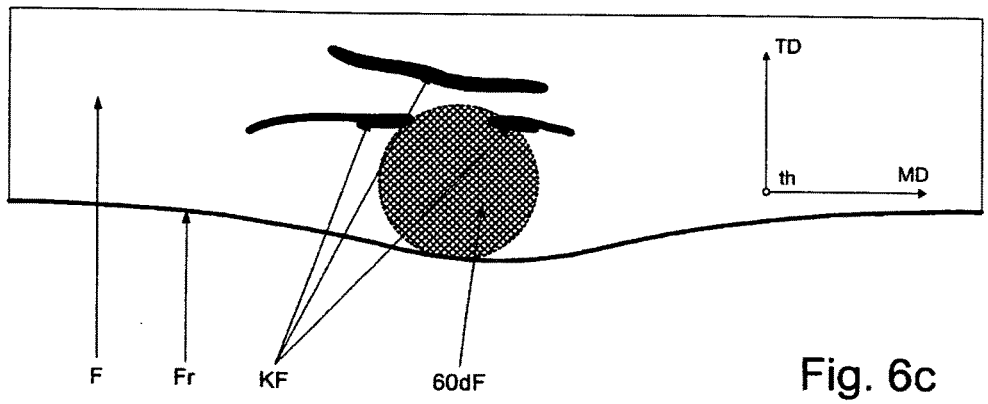

The greatly improved situation of FIG. 6c is achieved by the inventive solution. The gripping face 60dF now has a uniform thickness. The material is not pulled out under the gripper 6. The given shape WF is not a thin point KF in this case, but rather a material bead WF, which is produced by the stretching in the TD and MD directions.

In the following, reference is made to a modified embodiment by way of FIG. 7.

Figure 7:
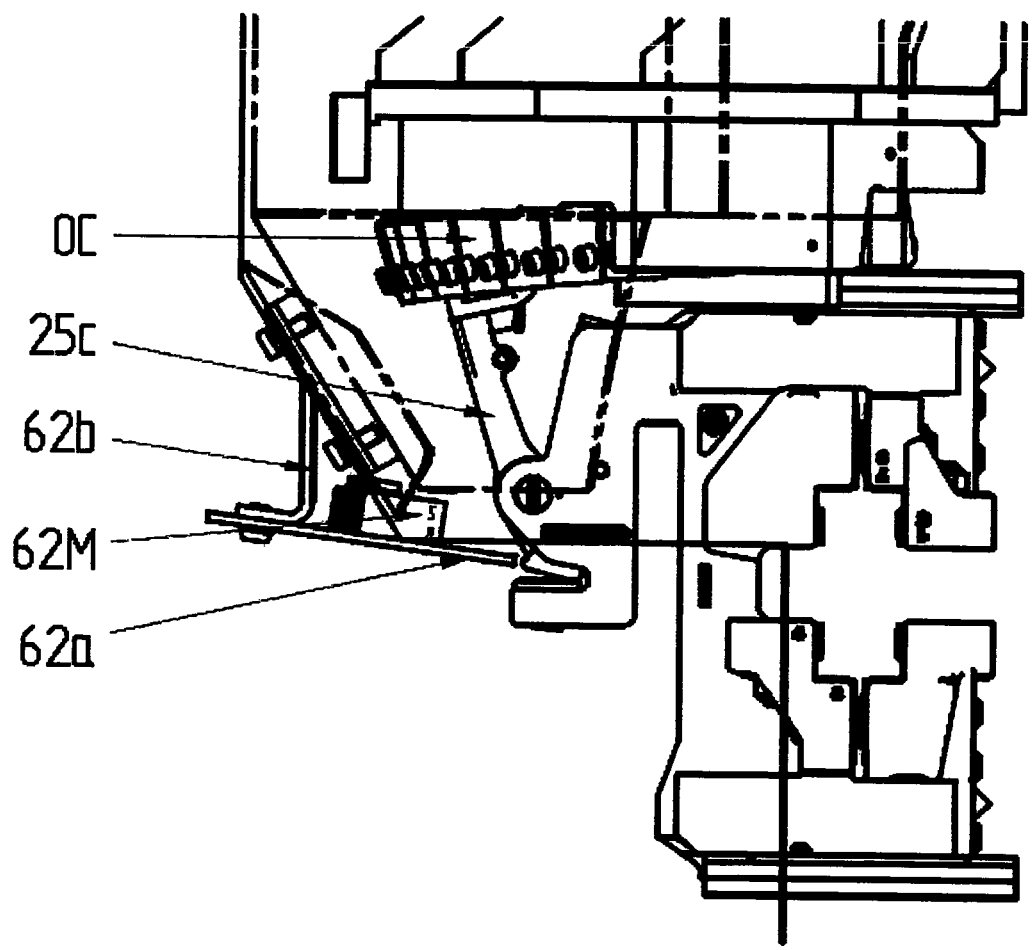
FIG. 7 is a cross-sectional view, transverse to a guide path, of an embodiment modified from the previous drawings.

The embodiment of FIG. 7 differs in the functional construction of the magnetic linkage device MK. By contrast with the previous embodiment, in the variant of FIG. 7 it is provided that the magnet or permanent magnet 62M disclosed and shown in the previous embodiment is not provided and/or mounted directly above the toggle lever flap 60c in the second toggle lever arm KH-S2, but instead in the form of a pole shoe 62a.

In the embodiment of FIG. 7, an arrangement is shown comprising a pole shoe 62a which is mounted in a stationary manner on the closing construction OC of the gripper.

In principle, the pole shoe is a rectangular metal sheet, on the upper face of which a plurality of rectangular magnets 62M are attached. The relevant magnets may be provided in a sufficient number and/or size. The polarity of the magnet arrangement is based on the polarity of the closing/opening arrangement OC. Normally, the X pole is directed towards the pole shoe sheet. The spacing SP between the pole shoe edge and the toggle lever flap 60c is 1-6 mm. The pole shoe edge follows the closer contour OC in terms of direction.

As a result of the pole shoe construction, closed magnetic field lines are generated, which extend over the exit face of the pole shoe edge and the end face 60'c through the toggle lever flap 60c, and thus hold the toggle lever flap 60c so as to be orientated in accordance with the mode of operation, as was explained by way of the previous embodiment.

The pole shoe 62a and the magnets 62M are fixed to the opening construction OC using a mounting 62b. The opening mechanism OC actuates the gripper lever 25c, in other words in accordance with a construction such as is known in principle from EP 0 782 499 B1 for actuating a gripper lever to open and close.

In a deviation from the pole shoe itself, however, a normal magnet may also be provided at a corresponding point, the south pole or north pole or another action face of which is orientated towards the end face of the toggle lever flap 60c so as to generate appropriate attraction forces. In this case too, a small gap or spacing SP should preferably be present between the defining faces of the pole shoe and the defining faces of any provided magnet and the toggle lever flap 60c or the end face 60'c of the toggle lever flap 60c, so as to make possible a similar force progression during the closing process to what was explained by way of the previous embodiment.

In principle, the gripping faces 60c and 61S are selected as desired within wide ranges as regards shape, configuration including surface configuration, size etc. In other words, the corresponding gripping faces 60c and 61S may preferably be round, polygonal or oval or have any other shape. Preferably, rounded edges are used for the gripping faces, in which case roundings should be configured without a transition, for example at radii of from 0.5 to 5.0 mm, preferably at a radius of r=1.5 mm.

Preferably, EPDM which is vulcanised on is used as the material for the gripping faces 60c and/or 61S. However, any other high-temperature-resistance and wear-resistant material may be used, such as Viton, polyurethane, bronze, brass or the like. The material may be attached to the toggle lever flap 60c and/or to the gripper base 61e. The connection is preferably provided by vulcanisation, but screwing, gluing, riveting etc. are also possible.

Therefore, to form the contact face, in general any material may be used which has a hardness of at most the hardness of the thermoplastic synthetic resin film to be stretched. The surface and structure (for example Ra, Rz) depends on the material pairing.

In the solution according to the invention according to FIGS. 2b to 6, a round magnet D7×3 (neodymium) is preferably glued in. The polarity is dependent on the polarity of the opener/closer OC. Normally, the N pole is located outwards towards the toggle lever flap.

The invention claimed is:

1. Gripper comprising a toggle lever arrangement for a transport system, in particular a stretching system, wherein
   the toggle lever arrangement comprises a gripper lever which is pivotable about a gripper axis with respect to a gripper mounting,
   the gripper lever is formed as a toggle lever and comprises a first toggle lever arm and a second toggle lever arm which are pivotable about a toggle lever axis relative to one another,
   the first toggle lever arm is pivotable about the gripper axis,
   the second toggle lever arm comprises a toggle lever flap on a free end thereof, the toggle lever flap comprising a gripping face,
   a gripper base comprising a gripper base surface and a gripping face formed thereon is provided on the gripper mounting,
   the two toggle lever arms of the gripper lever are pivotable in a pivot process between an open position and a closed, clamping position in such a way that the gripping face on the toggle lever flap and the gripping face of the gripper base are held so as to be remote from another in the open position and are held so as to be biased in contact with one another so as to fix an edge located in between of a material web in the closed, clamping position,
   a force application apparatus is configured to act on the second toggle lever arm pivotable about the toggle lever axis and/or on the toggle lever flap,
   the force application apparatus is configured such that when the gripper lever pivots from the open position thereof into the closed, clamping position thereof the toggle lever flap is initially placed on a side of the gripper base remote from the material web so as to pre-fix the material web in this region, before the toggle lever flap, during the pivot process, reaches the closed, clamping position thereof in which it holds the edge of the material web clamped between the gripping faces under application of force towards the gripper base,
   the force application apparatus comprises a magnetic linkage apparatus,
   the magnetic linkage apparatus comprises a magnet or a pole shoe which interacts with a further magnet or a further pole shoe or with ferromagnetic materials, and
   the magnet or the pole shoe is fixed to the second toggle lever arm pivotable about the toggle lever axis or to the toggle lever flap.

2. Gripper according to claim 1, wherein the magnet or the pole shoe is provided on the second toggle lever arm in the region of a rear face of the toggle lever flap.

3. Gripper according to claim 1, wherein the magnet or the pole shoe is arranged in such a way that a minimum gap is formed in a closest relative position, which generates maximum attraction forces, between the toggle lever flap and the magnet or the pole shoe.

4. Gripper according to claim 1, wherein the toggle lever flap is configured to be held in a defined position in the open position of the gripper lever such that the toggle lever flap strikes a stop and/or orientation piece on a face remote from the material web and has a force applied away from the gripper base by way of the force application apparatus on a side facing the material web.

* * * * *